United States Patent [19]

Hussein et al.

[11] Patent Number: 5,194,526

[45] Date of Patent: Mar. 16, 1993

[54] PROCESS FOR PRODUCING STICKY POLYMERS

[75] Inventors: Fathi D. Hussein, Cross Lanes; Kiu H. Lee, So. Charleston, both of W. Va.

[73] Assignee: Union Carbide Chemicals & Plastics Technology Corporation, Danbury, Conn.

[21] Appl. No.: 921,944

[22] Filed: Jul. 30, 1992

[51] Int. Cl.$^5$ ............................................... C08F 2/34
[52] U.S. Cl. ...................................... 526/74; 526/88; 526/193
[58] Field of Search ............................ 526/74, 88, 193

[56] References Cited

U.S. PATENT DOCUMENTS

| 4,649,128 | 3/1987 | Rekers | 502/109 |
| 4,803,251 | 2/1989 | Goode et al. | 526/74 |
| 5,026,795 | 6/1991 | Hogan | 526/74 |
| 5,037,905 | 8/1991 | Cummings | 526/74 |

Primary Examiner—Joseph L. Schofer
Assistant Examiner—David Wu
Attorney, Agent, or Firm—C. J. Vicari

[57] ABSTRACT

An improvement in the process for producing sticky polymers in a fluidized bed reactor catalyzed by a transition metal catalyst in the presence of an inert particulate material prone to generate excessive negative charges in said reactor, by conducting the process in the presence of a composition comprising a mixture of an alcohol phosphate salt and a quarternary ammonium salt, which is dissolved in a suitable solvent.

9 Claims, No Drawings

PROCESS FOR PRODUCING STICKY POLYMERS

FIELD OF THE INVENTION

The present invention relates to a process for producing sticky polymers and more particularly to a process for producing sticky polymers in gas phase reactors without experiencing polymer build up on reactor walls.

DESCRIPTION OF THE PRIOR ART

The introduction of high activity Ziegler-Natta catalyst systems has lead to the development of new polymerization processes based on gas phase fluid bed reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover larger quantities of solvent while advantageously providing low pressure process operation.

The versatility of the gas phase fluid bed reactor has contributed to its rapid acceptance. Alpha olefins polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions.

It has now become economically attractive to produce so called "sticky polymers" in gas phase fluid bed reactors. The term "sticky polymer" is defined as a polymer, which, although particulate at temperatures below the sticking or softening temperature, agglomerates at temperatures above the sticking or softening temperature. The term "sticking temperature", which, in the context of this specification, concerns the sticking temperature of particles of polymer in a fluidized bed, is defined as the temperature at which fluidization ceases due to excessive agglomeration of particles in the bed. The agglomeration may be spontaneous or occur on short periods of settling.

A polymer may be inherently sticky due to its chemical or mechanical properties or pass through a sticky phase during the production cycle. Sticky polymers are also referred to as non free flowing polymers because of their tendency to compact into agglomerates of much larger size than the original particles. Polymers of this type show acceptable fluidity in a gas phase fluidized bed reactor; however, once motion ceases, the additional mechanical force provided by the fluidizing gas passing through the distributor plate is insufficient to break up the agglomerates which form and the bed will not refluidize. These polymers are classified as those, which have a minimum bin opening for free flow at zero storage time of two feet and a minimum bin opening for free flow at storage times of greater than five minutes of 4 to 8 feet or more.

Sticky polymers can also be defined by their bulk flow properties. This is called the Flow Function. On a scale of zero to infinity, the Flow Function of free flowing materials such as dry sand is infinite. The Flow Function of free flowing polymers is about 4 to 10, while the Flow Function of non-free flowing or sticky polymers is about 1 to 3.

Although many variables influence the degree of stickiness of the resin, it is predominantly governed by the temperature and the crystallinity of the resin. Higher temperatures of the resin increase its stickiness while less crystalline products such as very low density polyethylene (VLDPE), ethylene/propylene monomer (EPM), ethylene/propylene diene monomer (EPDM) and polypropylene (PP) copolymers usually display a larger tendency to agglomerate to form larger particles.

As mentioned previously, production of sticky polymers can be carried out in gas-phase fluidized reactors. However to achieve fluidization of sticky polymers which have the tendency to settle and agglomerate under normal polymerization conditions, an inert small particle size material is injected into the bed to act as a fluidization aid. Thus, U.S. Pat. No. 4,994,534 issued to Rhee et al discloses the addition of an inert particulate material to a fluidized bed reactor which in effect prevents particle to particle agglomeration during polymerization. The fluidization aid material tends to cover the outer surface of each resin particle. One effective fluidization aid mentioned in said patent is carbon black, however, products made with even low levels of carbon black are completely black and are not satisfactory for applications that require colorable products.

White/colorable fluidization aids are also included in said patent and include different types of calcined silicas, clays, talc, and calcium carbonate. One major problem discovered with the addition of these white/colorable fluidization aids during the production of sticky polymers is their tendency to generate heavy negative statics which under polymerization conditions leads to resin build-up on reactor walls and as they reach certain thicknesses fall off and prevent either product discharge or proper fluidization. These conditions may force the shutdown of the polymerization reactor for the removal of these skins and sheets.

Accordingly it is an object of the present invention to provide an improvement in the process for continuously producing sticky polymers with the aid of an inert particulate material in a gas-phase fluidized bed reactor.

Another object is to provide a process for producing sticky polymers with the aid of an inert particulate material in a fluidized bed reactor which process permits operation over extended periods of time without experiencing reactor shut-down due to the generation of heavy negative static charges.

Another object is to provide a process for producing sticky polymers which are colorable.

A further object is to provide a process for producing sticky polymers in a gas-phase, fluidized bed reactor, over extended periods of time while minimizing the extent of resin build-up on the reactor walls.

These and other objects will be apparent from the following detailed description of the invention.

SUMMARY OF THE INVENTION

Broadly contemplated, the present invention provides an improvement in the process for producing sticky polymers in a fluidized bed reactor catalyzed by a transition metal catalyst in the presence of an inert particulate material prone to generate excessive negative charges in said reactor, the improvement comprising conducting said process in the presence of a composition comprising a mixture of an alcohol phosphate salt and a quarternary ammonium salt, said mixture being dissolved in a suitable solvent, said mixture being employed in an amount sufficient to substantially neutralize said negative static charge in said reactor.

DETAILED DESCRIPTION OF THE INVENTION

A process and apparatus which can be used to produce sticky polymers is disclosed in U.S. Pat. No. 4,994,534 which process is incorporated herein by reference.

Examples of sticky polymers which can be produced by the process disclosed in U.S. Pat. No. 4,994,534 and which pertain to the instant invention include ethylene/propylene rubbers and ethylene/propylene/diene termonomer rubbers, polybutadiene rubbers, high ethylene content propylene/ethylene block copolymers, poly (1 butene) (when produced under certain reaction conditions), very low density (low modulus) polyethylenes, i.e., ethylene butene rubbers or hexene containing terpolymers, ethylene/propylene/ethylidenenorbornene and ethylene/propylene hexadiene terpolymers of low density.

Characteristic of two types of resins which can be produced in U.S. Pat. No. 4,994,534 and which can be produced in the process of the present invention are as follows:

One type of resin is an ethylene/propylene rubber containing 25 to 65 percent, by weight, propylene. This material is sticky to the touch at reactor temperatures of 20° C. to 40° C. or higher and has a severe tendency to agglomerate when allowed to settle for periods of more than two to five minutes. Another sticky resin is an ethylene/butene copolymer produced at reactor temperatures of 50° C. to 80° C. at density levels of 880 to 905 kilograms per cubic meter and melt index levels of 1 to 20 and chlorinated or chlorosulfonated after being produced in the fluidized bed reactor.

In general, the inert particulate materials which cause excessive negative charges in the reactor are those of the inorganic oxide type. These include for example calcined silica, clays, talc, calcium carbonate and other like materials, commonly referred to as white fluidization aids. Carbon black however does not generate negative statics. Unfortunately however and as mentioned previously products made with even low levels of carbon black are completely black and are not satisfactory for application that require colorable products.

The composition which can be added to the polymerization reactor system is a mixture of an alcohol phosphate salt and a quarternary ammonium salt which is dissolved in a suitable solvent such as hexane, isopropanol, isopentane, or mixtures thereof. The amount of alcohol phosphate salt contained in the composition can vary between about 1% to 10% by weight based on the weight of the composition.

The quarternary ammonium salt can be present in the composition in amounts of about 1% to about 15% by weight, based on the weight of the composition.

The solvent can be present in the composition in amounts of about 8% to about 98% by weight, based on the weight of the composition.

A particularly suitable composition is available commercially under the tradename Statikil which is available from Statikil Inc. Akron, Ohio. This composition contains the following ingredients:
10 wt % Hexane
70 wt % Isopropanol
8.9 wt % Alcohol phosphate salts
11.1 wt % Quarternary Ammonium salt This composition has a specific gravity of 1 and an approximate boiling point of about 65° C.

The amount of negative charge reducing composition utilized generally depends on the type of inert material utilized and the type of polymer produced. In general the negative static charge reducing composition is employed in amounts of about 0.05% to 0.25% based on the weight of the resin preferably about 0.1% to 0.2% based on the weight of the resin.

The negative charge reducing composition can be added to the reaction system in a variety of ways. Thus, the composition can be metered to the reactor using a sight/glass motor valve and orifice feeding arrangement at a point above or below the distributor plate.

The following examples will further illustrate the present invention. For each of the examples sticky polymer was produced continuously in a gas-phase, fluidized bed reactor according to the procedure disclosed in U.S. Pat. No. 4,994,534. The catalyst was a vanadium-based and supported on silica particles. The catalyst system included a cocatalyst such as tri-isobutyl aluminum (TIBA) and a promoter such as chloroform. Ethylene, hydrogen, and comonomers (combinations of propylene and diene) were continuously fed to the reactor. An inert particulate material fluidization aid such as calcined silica (calcined to remove chemically bound water of hydration and minimize the level of the hydroxyl groups) was also utilized. The calcined silica was fed to the reactor at short intervals to keep an acceptable concentration level of silica in the reactor to prevent defluidization or agglomeration.

EXAMPLE 1

This example demonstrates that although carbon black as the inert material is effective for reducing negative static levels in the reactor, the products produced are black and uncolorable.

The reactor was started under sticky ethylene propylene diene monomer (EPDM) conditions that produced an ethylene-propylene-diene terpolymer using a vanadium catalyst and TIBA/Chloroform catalyst system at 50° C. The reactor was operated by initially using carbon as a fluidization aid. As the reaction was stabilized the carbon level was reduced and calcined silica was introduced as a fluidization aid. As the concentration of silica increased to 4 to 5 wt % and the carbon level dropped to 1 to 2 wt %, the static level increased in the bed from neutral to −600 to −700 volts. Skin thermocouples indicated the initiation of build-up formation on the reactor wall. To prevent the formation of sheets and skins and reactor shutdown, carbon feed was reestablished intermittently. The static level baseline returned back to neutral.

The resin produced was black and uncolorable. Everytime it was attempted to stop the carbon feed the static level baseline became negative and the skin thermocouples indicated the initiation of build-up on the reactor wall.

EXAMPLES 2-5

In these examples, a series of antistats and static drivers (an agent which generates an opposite charge to the charge existing in the bed) were tested for effect on reducing statics and allowing the production of colorable EPR product with negligible level of carbon.

In Example 2 the antistatic agent "Stadis 450" was utilized which consists of 66% by weight toluene, 13.3% by weight 1-decene polysulfone, 13.3% by weight polymeric polyamine and 7.4% by weight dodecylbenzene sulfonic acid. The mixture was added to the reactor in an amount sufficient to achieve the desired concentration of antistatic agent therein.

In Example 3, a known static driver, isopropanol, was tested under conditions similar to Example 2.

In Example 4, a further known static driver, acetone, was tested and in Example 5, the antistatic agent "Larostat" was tested. "Larostat" is available commercially from Pittsburg Plate and Glass Co., Inc. and includes diethanolamine.

In Examples 2-5, the reactor was started under conditions similar to Example 1. After stabilizing the reaction using carbon as a fluidization aid, the carbon level was reduced and calcined silica was used as fluidization aid. Carbon was fed intermittently everytime the static baseline dropped and the skin thermocouples indicated the initiation of build-up on the reactor wall.

In all examples 2-5 the static level baseline was not controlled unless carbon was fed intermittenly, thus making a black (noncolorable) product.

EXAMPLES 6-7

These examples demonstrate how an antistatic agent and a static driver agent were not effective in reducing negative static charges when producing colorable products.

The reaction process was started under sticky polymer production (EPR) conditions using a vanadium based catalyst and a TIBA/Chloroform system to produce slightly sticky resin with calcined silica as a fluidization aid and with no carbon to control statics. Sodium beta alumina (European Patent Application A1-01330686 to B. F. Goodrich) and PEG (polyethylene glycol) were utilized to bring the static level under control. However, the reactor was forced down as a result of skins due to negative static charges.

EXAMPLE 8

This example demonstrates the effect of "Statikil" for controlling negative static charges.

The fluidized bed reactor was started at 50° C. using a vanadium catalyst to produce EPDM (ethylene-diene-propylene) product. Calcined silica was used as a colorable fluidization aid. Carbon was added intermittenly to the reactor to keep the static activity under control. As the silica concentration in the reactor increased, the statics level appeared to gradually become negative. Carbon was administered every time the static level dropped below −500 volts to prevent build-up on the reactor wall. Statikil diluted in isopentane (10wt %) was fed to the reactor in an amount of about 1000 to 2000 ppm (w) of resin production. A few hours following the start of Statikil feed, the static level was gradually diminished and the carbon feed was stopped. The static level remained under control with no signs of build-up on the reactor wall or skin formation. The static baseline remained close to neutral. Static spikes due to silica shots were neutralized within minutes thus keeping the overall static level under control.

Reactor operation and static activity remained smooth for 26 hours with no need to feed carbon for static control. After 26 hours of feeding Statikil, the antistat feeding system developed a leak resulting in feeding very little Statikil to the reactor. The Statikil feed system was taken out of service. During this time, the static activity became negative requiring carbon feed every 1 or 2 hours (from 1 to 2 wt % carbon) to neutralize the static activity.

EXAMPLE 9

The reactor was started up under the same conditions as in Example 8. Again calcined silica was used as colorable fluidization aid and shots of carbon were added to the reactor to keep the statics under control. The carbon feed was stopped and Statikil feed was established. The static activity was stabilized three hours after establishing Statikil feed and kept under control without the need of carbon feed. The reactor was operated for about 24 hours without feeding carbon.

EXAMPLE 10

The reactor was restarted under the same EPDM producing conditions as in Example 8. A few hours after establishing reaction with calcined silica as colorable fluidization aid, and using carbon to control statics, Statikil feed to the reactor was started. Within 2 hours of feeding Statikil, the static activity subsided and carbon shots were stopped. The static activity remained under control with Statikil feed rate at a concentration in the resin of about 800 to 1200 ppm by weight and without the need of carbon feed. The static activity appeared to be related to the concentration level of Statikil in the bed. The static activity increased as the Statikil concentration dropped below 800 ppm. The reactor operated smoothly without a need for carbon feed and with statics under control using Statikil for 27 hours. The statics activity increased sharply when the Statikil feed was interrupted.

EXAMPLE 11

The reactor was started up under EPDM production conditions as indicated in Example 8. After the reaction and Statikil feed rate were stabilized, the statics activity baseline oscillated around neutral level with occasional spikes due to silica shots. It was observed again that the static activity was dependent on the level of Statikil, and the static level baseline could be brought back to neutral by increasing or decreasing the level of the Statikil feed rate. The reactor continued to line out smoothly without feeding any carbon for over 5 days with only Statikil to control the static baseline. The resin became white (colorable). Reactor operation appeared to be robust in spite of the silica induced static spikes. Statikil is a moderate positive driver which tends to drive the static activity from negative to positive depending on its concentration in the reactor and the level of static activity.

As will be discerned from the above examples, the mere utilization of an antistatic agent for controlling build-up of polymer on the reactor walls is not sufficient when producing sticky polymers by the fluidized bed technique. It was surprisingly found however that if the process is conducted in the presence of a composition comprising a mixture of an alcohol phosphate salt and a quarternary ammonium salt dissolved in a suitable solvent, that any negative charges generated in the reactor could be neutralized.

From the foregoing description, one skilled in the art can easily ascertain the essential characteristics of this invention, and without departing from the spirit and scope thereof, can make various changes and modifications of the invention to adapt it to various usages and conditions. For example, one skilled in the art can use the process of the present invention to prevent reactor fouling in any type of gas phase polymerization process. The broad description of a particular gas phase polymerization process is provided merely to illustrate and facilitate a clear understanding of the process of this invention.

What is claimed is:

1. In a process for producing sticky polymers in a fluidized bed reactor in which comonomers are polymerized by a transition metal catalyst in the presence of an inert particulate material prone to generate excessive negative charges in said reactor, the improvement comprising conducting said process in the presence of a composition comprising a mixture of an alcohol phosphate salt and a quarternary ammonium salt, said mixture being dissolved in a suitable solvent, said mixture being employed in an amount sufficient to substantially neutralize said negative static charge in said reactor.

2. The improvement according to claim 1 wherein said composition is employed in an amount of about 0.05% to about 0.25% based on the weight of resin.

3. The improvement according to claim 1 wherein said composition is employed in an amount of about 0.1% to about 0.2% based on the weight of resin.

4. The improvement according to claim 1 wherein the amount of alcohol phosphate salt present in said composition is about 1% to about 10% based on the weight of the composition.

5. The improvement according to claim 1 wherein the amount of quarternary ammonium salt present in said composition is about 1% to about 15% based on the weight of the composition.

6. The improvement according to claim 1 wherein the amount of solvent present in said composition is about 8% to about 98% based on the weight of the composition.

7. The improvement according to claim 1 wherein said sticky polymers are:
   a. ethylene propylene rubbers;
   b. ethylene propylene diene termonomer rubbers;
   c. polybutadiene rubbers; and
   d. high ethylene content propylene ethylene block copolymers.

8. The improvement according to claim 7 wherein said ethylene propylene diene termonomers are ethylene/propylene/ethylidenenorbornene termonomers.

9. The improvement according to claim 7 wherein said ethylene propylene diene termonomers are ethylene/propylene/hexadiene termonomers.

* * * * *